US008750076B2

(12) United States Patent
Miyamoto et al.

(10) Patent No.: US 8,750,076 B2
(45) Date of Patent: *Jun. 10, 2014

(54) POSITION DETECTION SYSTEM, TRANSMISSION DEVICE, RECEPTION DEVICE, POSITION DETECTION METHOD AND POSITION DETECTION PROGRAM

(75) Inventors: Junichi Miyamoto, Tokyo (JP); Hiroshi Kajitani, Tokyo (JP)

(73) Assignee: NEC Corporation, Tokyo (JP)

(*) Notice: Subject to any disclaimer, the term of this patent is extended or adjusted under 35 U.S.C. 154(b) by 491 days.

This patent is subject to a terminal disclaimer.

(21) Appl. No.: 13/055,819

(22) PCT Filed: Jul. 15, 2009

(86) PCT No.: PCT/JP2009/062791
§ 371 (c)(1),
(2), (4) Date: Jan. 25, 2011

(87) PCT Pub. No.: WO2010/010832
PCT Pub. Date: Jan. 28, 2010

(65) Prior Publication Data
US 2011/0116345 A1 May 19, 2011

(30) Foreign Application Priority Data
Jul. 25, 2008 (JP) ................. 2008-191800

(51) Int. Cl.
*G01S 3/80* (2006.01)
*G01S 5/22* (2006.01)
*G01S 11/16* (2006.01)
(52) U.S. Cl.
CPC . *G01S 11/16* (2013.01); *G01S 5/22* (2013.01); *Y10S 367/907* (2013.01)
USPC ............ 367/128; 367/124; 367/127; 367/907
(58) Field of Classification Search
USPC .......................... 367/124, 127, 128, 129, 907
See application file for complete search history.

(56) References Cited

U.S. PATENT DOCUMENTS 4,933,916 A * 6/1990 May et al. ...................... 367/125
(Continued)

FOREIGN PATENT DOCUMENTS

JP 2-102477 A 4/1990
(Continued)

OTHER PUBLICATIONS

International Search Report for PCT/JP2009/06279 mailed Aug. 18, 2009.
(Continued)

*Primary Examiner* — Ian J Lobo
(74) *Attorney, Agent, or Firm* — Sughrue Mion, PLLC (57) ABSTRACT

To enable precise calculation of a propagation time of a direct wave which arrives the earliest from an ultrasonic emission source without being affected by a reflected wave. A plurality of ultrasonic signals generated based on a plurality of M sequences different from each other are propagated from a transmission side to a reception side, whereby the reception side executes processing of correlation between each model waveform of the plurality of M sequences and a waveform of each ultrasonic signal and detects a subsidiary peak of a correlation value appearing when both waveforms partly coincide with each other to, starting with the smallest one of subsidiary peaks detected by all the correlation processing, determine a plurality of corresponding M sequences. The transmission side selects an M sequence differing in each transmission cycle from among the determined plurality of M sequences and sends out an ultrasonic signal modulated by the selected M sequence and an electromagnetic wave signal to the reception side. The reception side calculates a value of correlation between the ultrasonic signal and a model waveform, detects a first main peak of the calculated correlation value and calculates an ultrasonic propagation time from a time point of the reception of the electromagnetic wave signal and a time point of the detection of the main peak.

32 Claims, 8 Drawing Sheets

(56) References Cited

U.S. PATENT DOCUMENTS

| | | | | |
|---|---|---|---|---|
| 5,075,863 | A | * | 12/1991 | Nagamune et al. ........... 702/159 |
| 6,157,592 | A | * | 12/2000 | Kriz et al. .................... 367/127 |
| 6,404,703 | B1 | * | 6/2002 | Burrell ......................... 367/128 |
| 2008/0084789 | A1 | * | 4/2008 | Altman ......................... 367/127 |
| 2008/0128178 | A1 | * | 6/2008 | Jia .............................. 178/18.01 |
| 2009/0145232 | A1 | * | 6/2009 | Suginouchi et al. ........... 73/597 |
| 2010/0005890 | A1 | * | 1/2010 | Miyamoto ..................... 73/597 |

FOREIGN PATENT DOCUMENTS

| | | |
|---|---|---|
| JP | 7-104063 A | 4/1995 |
| JP | 2001008262 A | 1/2001 |
| JP | 2004108826 A | 4/2004 |
| WO | 2009028680 A | 3/2009 |

OTHER PUBLICATIONS

H. Kashiwagi, "M-sequence and Its Applications", Shokodo, Mar. 25, 1996, pp. 1-5, 16-37.

* cited by examiner

EXAMPLE OF TWO-DIMENSION (TWO RECEIVERS)

POSITION DETECTION SYSTEM, TRANSMISSION DEVICE, RECEPTION DEVICE, POSITION DETECTION METHOD AND POSITION DETECTION PROGRAM

INCORPORATION BY REFERENCE

This application is the National Phase of PCT/JP2009/062791, filed Jul. 15, 2009, which is based upon and claims the benefit of priority from Japanese patent application No. 2008-191880, filed on Jul. 25, 2008, the disclosure of which is incorporated herein in its entirety by reference.

TECHNICAL FIELD

The present invention relates to a position determination system which determines a position of a moving body by using an ultrasonic signal and, more particularly, a position detection system, a transmission device, a reception device, a position detection method and a position detection program which enable a position of a moving body to be precisely and stably determined by using ultrasonic.

BACKGROUND ART

Recited in Patent Literature 1 as one example of systems which measure a distance by a propagation time of ultrasonic is an ultrasonic object measuring device. The ultrasonic object measuring device recited in Patent Literature 1 subjects a tone burst wave generated from a tone burst wave generator to frequency diffusion modulation by a pseudo noise signal from a pseudo noise signal generator by means of a frequency diffusion modulator and transmits the obtained signal.

Cross-correlation is obtained by a cross-correlation unit between a signal obtained by demodulating a received reflected wave by a frequency diffusion signal demodulator and a pseudo noise signal used in frequency diffusion. Furthermore, from the correlation level obtained by a correlation level detector 9, reception/non-reception of a reflected signal on an object is determined to measure a distance.

In addition, a transmission tone burst wave is sent out with a frequency diffusion modulated signal obtained by sequentially switching and distinguishing a plurality of pseudo noise signals to distinguish and determine a plurality of tone burst waves.

Patent Literature 1: Japanese Patent Laying-Open No. H07-104063

Non-Patent Literature 1: Hiroshi Kashiwagi, "M-sequence and Its Applications" (Shokodo, Mar. 25, 1996).

Since for an ultrasonic signal transmitted from an ultrasonic emission source, a frequency higher than an audible band which frequency is audible to no person is used, at least not lower than 20 kHz is required. Known as a unit for generating a signal of this frequency band with enough sound pressure is a so-called speaker which electromagnetically vibrates and drives a small-sized diaphragm with high rigidity. Because of difficulty of down-sizing and large power consumption due to current-drive, however, it is difficult to mount a speaker on a small-sized moving body. As a result, a piezo-electric element which is driven by voltage is widely used as an ultrasonic emission source.

Although the piezo-electric element has small power consumption because it is driven by voltage, it is often used in combination with a resonator whose acoustic impedance is low in order to ensure enough sound pressure. When a resonation phenomenon is used, however, while ultrasonic can be emitted with fixed phase, frequency and gain, a transmission gain at other frequencies is considerably low, so that it is difficult to use a modulation system having wide band frequency characteristics such as frequency diffusion modulation.

In addition, since also in a single piezo-electric element, a mechanical Q is high to have residual oscillation remain for long, it is difficult to emit ultrasonic precisely following a modulated wave irrespective of a modulation system.

Since when a transmission source having heavy residual oscillation is used in a transmitter for such ultrasonic or when a transmission source is shorter of band than a frequency band necessary for transmission and reception of ultrasonic subjected to frequency diffusion modulation, it is difficult to transmit an ideal modulated wave, it is accordingly difficult to suppress a subsidiary correlation peak caused by non-pseudo noise.

OBJECT OF THE PRESENT INVENTION

An object of the present invention is to provide, in a system in which ultrasonic sent from a transmitter is received by a receiver and a propagation time of the ultrasonic is measured to detect a distance between the transmitter and the receiver or a position of the transmitter, a position detection system, a transmission device, a reception device, a position detection method and a position detection program which enable, in each measurement cycle, reduction in effects of a reflected wave of ultrasonic transmitted in preceding cycles to precisely measure a propagation time of a direct wave arriving the earliest.

SUMMARY

According to a first exemplary aspect of the invention, a position detection system, includes a moving body including a transmission unit which sends an ultrasonic signal modulated based on a pseudo random signal whose self-correlativity is high, and a reception unit which receives the ultrasonic signal, generates a model waveform of ultrasonic modulated by the same pseudo random signal as the pseudo random signal, obtains a value of correlation with the received ultrasonic signal, and starting with the smallest one of subsidiary peaks of a correlation value appearing when the ultrasonic signal coincides in part with the pseudo random signal model waveform, selects corresponding the pseudo random signal in plural, wherein the transmission unit includes a unit which simultaneously sends an electromagnetic wave signal and an ultrasonic signal modulated based on the pseudo random signal selected, and the reception unit includes a unit which executes processing of correlating the ultrasonic signal and an ultrasonic model waveform modulated by the pseudo random signal to specify an arrival time of the ultrasonic signal and calculates a propagation time of ultrasonic from an arrival time point of the electromagnetic wave signal and the specified arrival time, and a unit which calculates a position of the moving body based on the ultrasonic propagation time calculated and a length of interval between the ultrasonic reception units, and wherein the transmission unit uses a pseudo random signal differing in each transmission cycle.

According to a second exemplary aspect of the invention, a transmission device of a position detection system in which an ultrasonic signal transmitted from the transmission device is received by a reception device to detect a position of the transmission device, includes a unit which sends a first ultrasonic signal modulated based on a pseudo random signal whose self-correlativity is high and a unit which simultaneously sends an electromagnetic wave signal indicative of transmission timing and a second ultrasonic signal modulated based on a pseudo random signal selected by the reception device, wherein a pseudo random signal differing in each transmission cycle is used.

According to a third exemplary aspect of the invention, a reception device of a position detection system in which an ultrasonic signal transmitted from a transmission device is received by the reception device to detect a position of the transmission device, includes a unit which receives a first ultrasonic signal modulated by data of a pseudo random sequence with high self-correlativity which is transmitted from the transmission device, generates a model waveform of ultrasonic modulated by the same pseudo random signal as the pseudo random signal, obtains a value of correlation with the received ultrasonic signal, and starting with the smallest one of subsidiary peaks of a correlation value appearing when the ultrasonic signal coincides in part with the pseudo random signal model waveform, selects corresponding the pseudo random signal in plural, a unit which receives an electromagnetic wave signal and a second ultrasonic signal modulated based on a pseudo random signal selected by the reception device which are simultaneously sent from the transmission device, executes processing of correlation between the second ultrasonic signal and an ultrasonic model waveform modulated by the pseudo random signal to specify an arrival time of the ultrasonic signal, and calculates a propagation time of ultrasonic from an arrival time point of the electromagnetic wave signal and the specified arrival time, and a unit which calculates a position of the moving body based on the ultrasonic propagation time calculated and a length of interval between the ultrasonic reception units.

According to a fourth exemplary aspect of the invention, a position detection method, includes the steps of a) sending out an ultrasonic signal modulated based on a pseudo random signal whose self-correlativity is high from a transmission unit of a moving body, b) receiving the ultrasonic signal at a reception unit, generating a model waveform of ultrasonic modulated by the pseudo random signal and executing correlation between the model waveform and the received ultrasonic signal to detect a correlation waveform, c) with respect to different pseudo random signals, detecting the correlation waveform in plural, and starting with the smallest one of subsidiary peaks appearing in each correlation waveform when the model waveform and the received ultrasonic signal coincide in part, selecting corresponding the pseudo random signal in plural, d) sending an ultrasonic signal modulated based on a pseudo random signal selected at the Step (c) and an electromagnetic wave signal including a trigger signal indicative of transmission timing and data which defines the pseudo random signal simultaneously from the moving body in each fixed transmission cycle, e) receiving the electromagnetic wave signal to generate an ultrasonic model waveform modulated by the pseudo random signal from data which defines a pseudo random signal that the electromagnetic wave signal includes, f) receiving the ultrasonic signal to calculate a value of correlation between the received ultrasonic signal and the ultrasonic model waveform generated at Step (e), and g) calculating a position of the moving body based on the ultrasonic propagation time calculated and a length of interval between the ultrasonic reception units, wherein the step (d) uses a pseudo random signal differing in each transmission cycle.

According to a fifth exemplary aspect of the invention, a position detection program which causes a computer forming a transmission device provided in a moving body to execute a processing of sending out an ultrasonic signal modulated based on a pseudo random signal whose self-correlativity is high from a transmission unit of the moving body, causes a computer forming a reception device to execute a processing of receiving the ultrasonic signal, generating a model waveform of ultrasonic modulated by the pseudo random signal and executing processing of correlation between the model waveform and the received ultrasonic signal to detect a correlation waveform, and with respect to different pseudo random signals, a processing of detecting the correlation waveform in plural, and starting with the smallest one of subsidiary peaks appearing in each correlation waveform when the model waveform and the received ultrasonic signal coincide in part, selecting corresponding the pseudo random signal in plural, causes the computer forming the transmission device to execute a processing of sending an ultrasonic signal modulated based on a pseudo random signal selected and an electromagnetic wave signal including a trigger signal indicative of transmission timing and data which defines the pseudo random signal simultaneously from the moving body in each fixed transmission cycle, and causes the computer forming the reception device to execute a processing of receiving the electromagnetic wave signal to generate an ultrasonic model waveform modulated by the pseudo random signal from data which defines a pseudo random signal that the electromagnetic wave signal includes, a processing of receiving the ultrasonic signal to calculate a value of correlation between the received ultrasonic signal and the ultrasonic model waveform generated, and a processing of calculating a position of the moving body based on the ultrasonic propagation time calculated and a length of interval between the ultrasonic reception units, wherein in the sending-out of the ultrasonic signal from the transmission device, a pseudo random signal differing in each transmission cycle is used.

The present invention enables precise calculation of a propagation time of a direct wave arriving the earliest from an ultrasonic emission source without being affected by a reflected wave of an ultrasonic signal.

EXEMPLARY EMBODIMENT

Next, a first exemplary embodiment of the present invention will be detailed with reference to FIG. 1 through FIG. 11.
(First Exemplary Embodiment)

Figure 1:
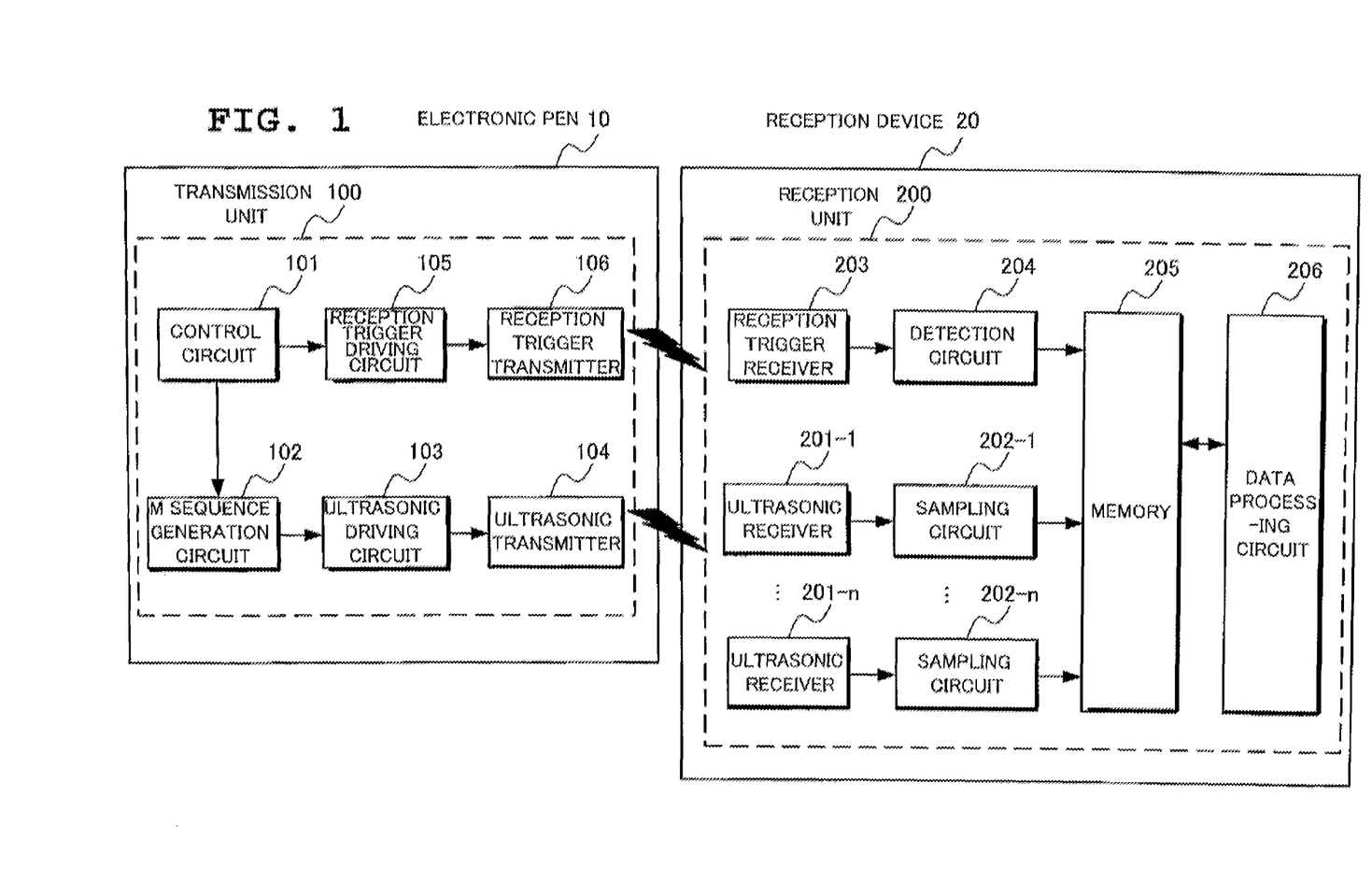
FIG. 1 is a block diagram showing a structure of a transmission unit and a reception unit of a position detection system according to a first exemplary embodiment of the present invention.

FIG. 1 is a block diagram showing a structure of a position detection system according to a first exemplary embodiment of the present invention. In the following exemplary embodiment, description will be made of a case where the position detection system according to the present invention is applied to an electronic pen system.

In FIG. 1, the position detection system using ultrasonic propagation time measurement according to the first exemplary embodiment of the present invention comprises an electronic pen 10 as a movable body to which a transmission unit 100 is attached, and a reception device 20 comprising a reception unit 200 disposed at a predetermined position apart from the electronic pen 10. In the present position detection system, selection of an M sequence (hereinafter, referred to as an M sequence selection mode) to be used is executed prior to measurement of an ultrasonic propagation time.

The transmission unit 100 of the electronic pen 10 comprises a control circuit 101, an M sequence generation circuit 102, an ultrasonic driving circuit 103, an ultrasonic transmitter 104, a reception trigger driving circuit 105 and a reception trigger transmitter 106.

M sequence generated by the M sequence generation circuit 102 is a sequence generated by a characteristic polynomial, which is obtained by defining a characteristic polynomial and an initial condition. Details of an M sequence are described in, for example, Non-Patent Literature 1 (Hiroshi Kashiwagi, "M-Sequence and Its Applications", Mar. 25, 1996, Shokodo). Used, for example, is a data string having a sequence length of 15 bits which is generated by a quartic characteristic polynomial $f(x)=x^4+x+1$. 15 different data strings whose data arrangement is circularly shifted are obtained by changing an initial condition.

In an M sequence selection mode, the control circuit 101 determines an initial condition of an M sequence based on a characteristic polynomial determined in each transmission cycle in advance and transmits the initial condition to the M sequence generation circuit 102 and the reception trigger driving circuit 105 in a fixed transmission cycle.

The M sequence generation circuit 102 generates a coded bit string of an M-sequence differing in each transmission cycle according to the initial condition sent from the control circuit 101.

The ultrasonic driving circuit 103 supplies the ultrasonic transmitter 104 with the M sequence data generated by the M sequence generation circuit 102 as a driving signal for ultrasonic modulation.

The ultrasonic transmitter 104 modulates ultrasonic with the driving signal from the ultrasonic driving circuit 103 as a modulation signal and sends out an ultrasonic signal which is M-sequence modulated into space. Used in a preferred mode of implementation for the modulation of ultrasonic is a phase modulation method.

On the other hand, the control circuit 101 instructs the reception trigger driving circuit 105 to generate a trigger pulse and subsequently supplies the reception trigger driving circuit 105 with initial condition data which is obtained by coding the initial condition of the above-described M sequence.

The reception trigger transmitter 106 is driven by an output of the reception trigger driving circuit 105 in synchronization with transmission timing of the ultrasonic transmitter 104 to send a trigger signal into space through the electronic pen 10. The trigger signal is sent as an infrared signal which is an electromagnetic wave signal, for example.

An M sequence is selected in the M sequence selection mode in a manner as will be described later. In an ultrasonic propagation time measurement mode to follow, the control circuit 101 sequentially determines an initial condition of an M sequence in each transmission cycle from among a plurality of initial conditions determined in the M sequence selection mode based on an M sequence characteristic polynomial and transmits the initial condition to the M sequence generation circuit 102 and the reception trigger driving circuit 105.

The M sequence generation circuit 102 generates M sequence data according to the initial condition. The ultrasonic driving circuit 103 supplies the ultrasonic transmitter 104 with the M sequence data as a driving signal for ultrasonic modulation. The ultrasonic transmitter 104 modulates ultrasonic with the driving signal as a modulation signal and sends the M-sequence modulated ultrasonic signal into space.

Figure 2:
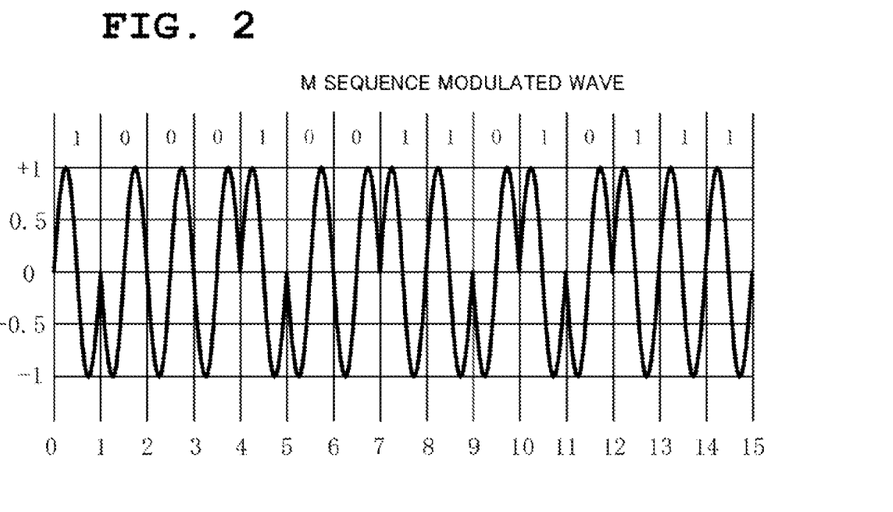
FIG. 2 is a diagram showing an example of ultrasonic M sequence data modulated by phase modulation with one cycle assigned per one bit.

FIG. 2 shows, as one example of M sequence coding, an example of a waveform of a modulated wave obtained by M-sequence phase-modulation. Shown here is a waveform of an ultrasonic signal obtained by phased-modulating ultrasonic of a fixed frequency by 15-bit M sequence "100010011010111". With one bit corresponding to one cycle of a basic wave (e.g. 40 kHz), the waveform shown in FIG. 2 is phase-modulated to have an inverted phase in a case of "0" and to have the same phase in a case of "1", and a modulated wave has a length of 15 cycles of the basic wave.

On the other hand, the control circuit 101 instructs the reception trigger driving circuit 105 to generate a trigger signal and subsequently supplies the selected M sequence initial condition data to the reception trigger driving circuit 105.

In synchronization with transmission timing of the ultrasonic transmitter 104, the reception trigger transmitter 106 is driven by an output of the reception trigger driving circuit 105 to send a trigger signal into space through the electronic pen 10.

The reception unit 200 of the reception device 20 comprises one or a plurality of ultrasonic receivers 201, one or a plurality of sampling circuits 202 corresponding to the ultrasonic receiver 201, a reception trigger receiver 203, a detection circuit 204, a memory 205 and a data processing circuit 206.

The reception trigger receiver 203 receives a trigger signal from the electronic pen 10 and converts the trigger signal into an electric signal.

Upon detecting a trigger signal from the output of the reception trigger receiver 203, the detection circuit 204 stores an arrival time of the trigger signal in the memory 205, then detects M sequence initial condition data and stores the same in the memory 205.

The ultrasonic receiver 201 receives an ultrasonic signal transmitted from the electronic pen 10 and converts the same into an electric signal of an M sequence code.

The sampling circuit 202 samples the output from the ultrasonic receiver 201 at fixed intervals ($\Delta T$) and sequentially stores waveform data of the sampled ultrasonic in the memory 205. In addition, the sampling circuit 202 executes filtering processing as required aiming at noise removal.

Figure 3:
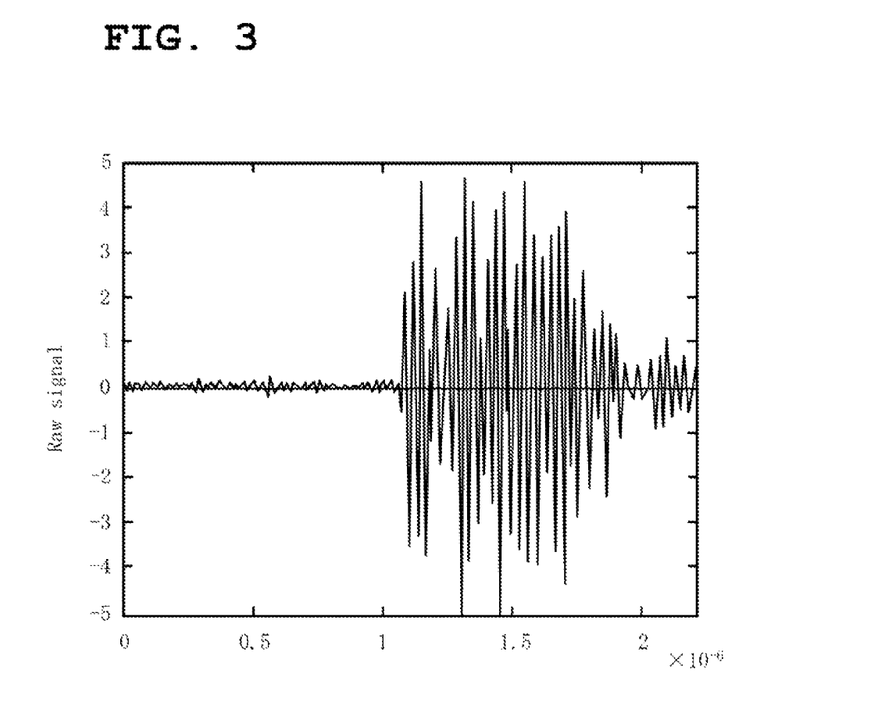
FIG. 3 is a diagram showing an example of an ultrasonic waveform to be stored in a memory of the reception unit of the position detection system according to the first exemplary embodiment of the present invention.

FIG. 3 shows an example of a waveform of received ultrasonic which is phase-modulated by a 15-bit M sequence data string "100010011010111". Shown here is a waveform of ultrasonic stored in the memory 205 with the sampling interval ($\Delta T$) as one-sixteenth of a basic wave cycle of ultrasonic. The abscissa represents time with a time point of reception of a trigger signal as "0". When ultrasonic whose basic wave frequency is 20 kHz is used, the basic cycle of the ultrasonic will be 50 μsec and the sampling interval will be 3.125 μsec. The waveform of the ultrasonic stored in the memory 205 (FIG. 3) will be a composite wave of a direct wave and a reflected wave of the transmitted ultrasonic and noise.

When data indicative of arrival time of a trigger signal is stored in the memory 205, the data processing circuit 206 reads M sequence initial condition data and based on the initial condition (furthermore, a characteristic polynomial as required), generates an M sequence model waveform and executes correlation processing with the ultrasonic waveform stored in the memory 205.

In the M sequence selection mode, a trigger signal and an ultrasonic signal are repeatedly sent from the electronic pen 10. At this time, an M sequence differing in each transmission is used. The data processing circuit 206 checks an optimum level of the M sequence used based on a plurality of subsidiary peaks of the level of correlation between the ultrasonic waveform and the M sequence model waveform occurring when they partially coincide with each other in configuration at every reception. Give higher evaluation to an M sequence whose largest subsidiary peak is smaller. Among all the M sequences, select a corresponding M sequence in order starting with one whose largest subsidiary peak is the smallest.

When in the ultrasonic propagation measurement mode, a trigger signal and an ultrasonic signal generated based on the selected M sequence are sent out to execute correlation processing. Upon detecting a first peak of the correlation value, the data processing circuit 206 calculates an elapsed time from an arrival time of a trigger signal until a time of detection of the peak, that is, a propagation time of the ultrasonic signal arriving at the reception unit 200 from the electronic pen 10.

(Operation Of The Exemplary Embodiment)

Figure 4:
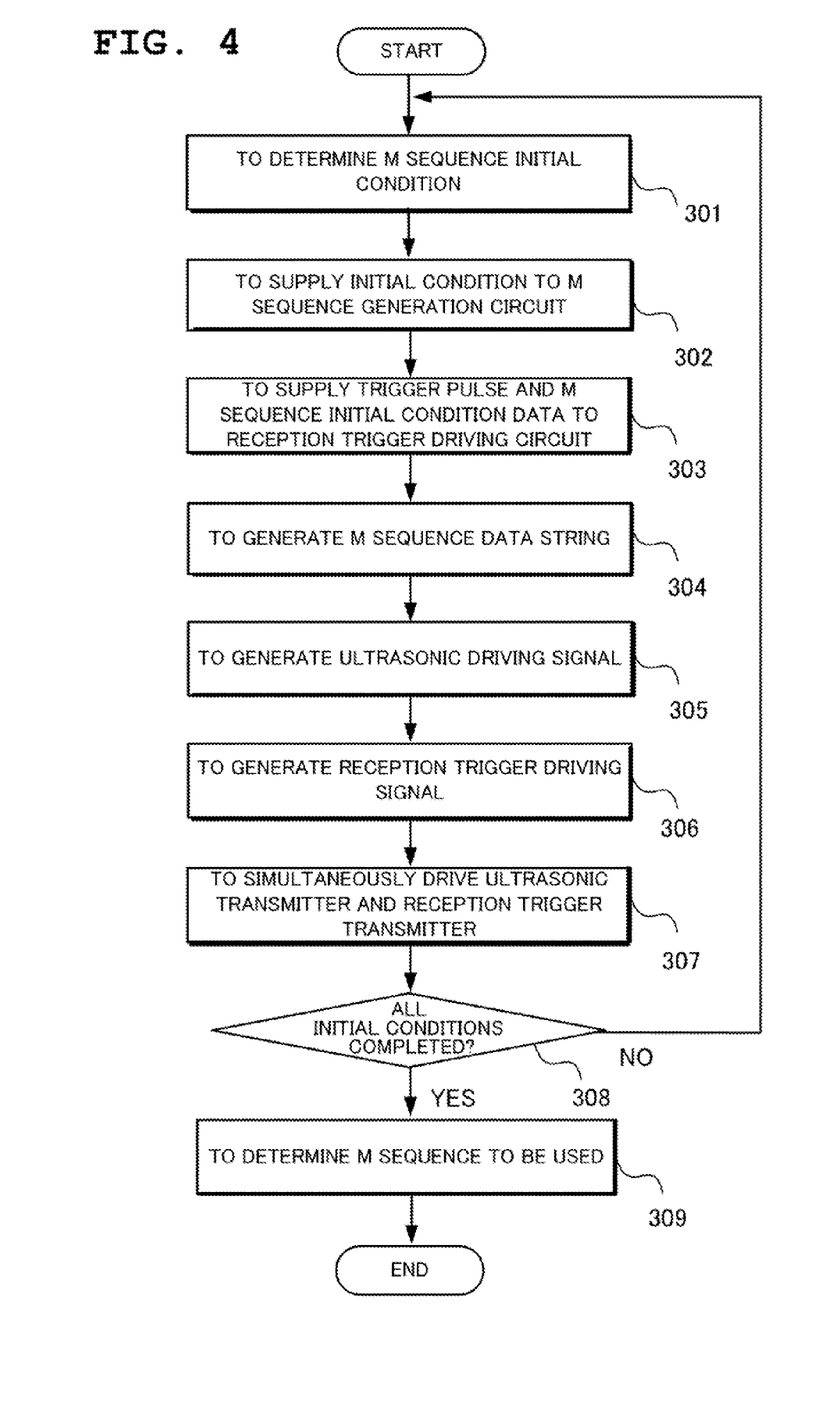
FIG. 4 is a flow chart showing operation of the transmission unit in an M sequence selection mode in the position detection system according to the first exemplary embodiment of the present invention.
Figure 5:
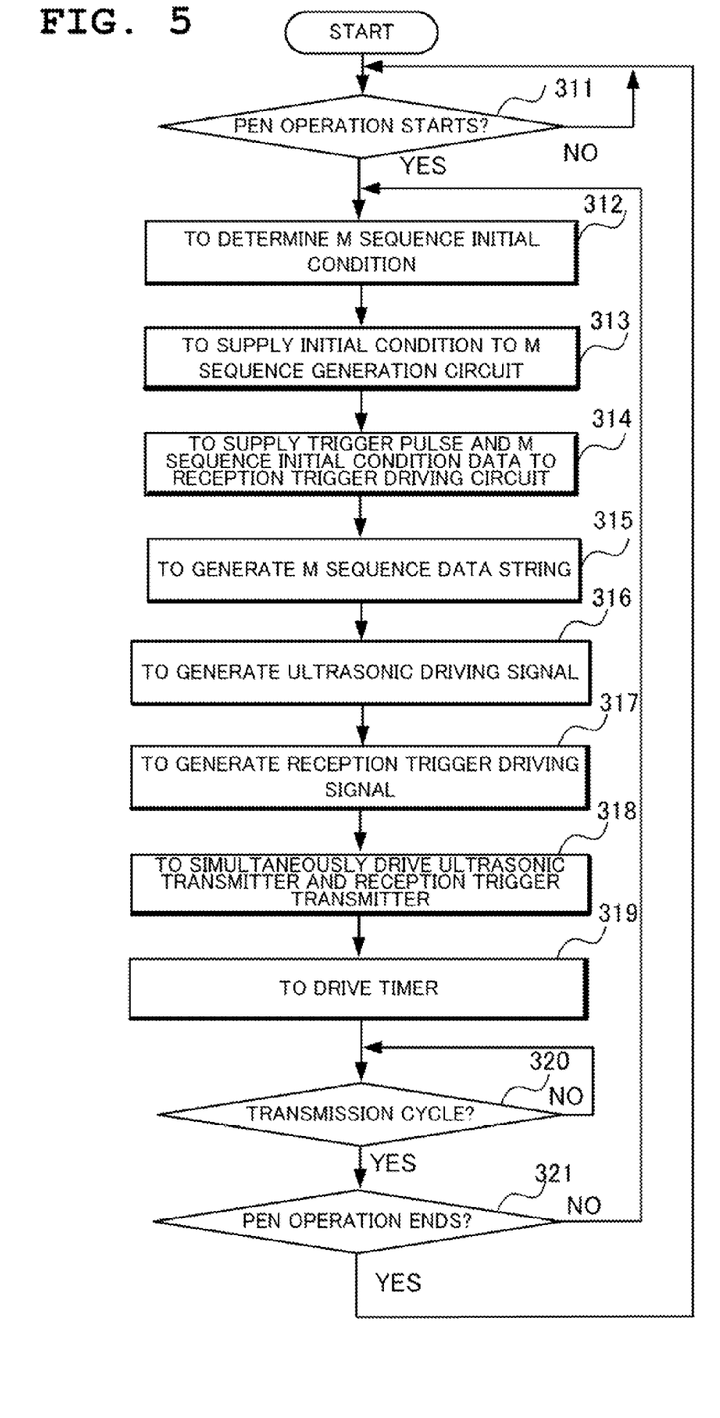
FIG. 5 is a flow chart showing operation of the transmission unit in an ultrasonic propagation measurement mode.

Next, with reference to the flow charts of FIG. 4 and FIG. 5, description will be made of operation of the control circuit 101 of the transmission unit 100 in the first exemplary embodiment of the present invention. Description will be also made of operation of the data processing circuit 206 of the reception unit 200 with reference to the flow chart of FIG. 6.

First, description will be made of a case of the M sequence selection mode. In FIG. 4, the control circuit 101 selects an arbitrary M sequence from a plurality of M sequences different from each other and determines an initial condition of the selected M sequence (Step 301).

The control circuit 101 supplies the M sequence generation circuit 102 with a determined initial condition (Step 302).

Upon determining the initial condition of the M sequence, the control circuit 101 instructs the reception trigger driving circuit 105 to generate a trigger pulse and supplies initial condition data obtained by coding the initial condition to the reception trigger driving circuit 105 (Step 303).

The M sequence generation circuit 102 generates M sequence data based on the initial condition set by the control circuit 101 (Step 304) and supplies the same to the ultrasonic driving circuit 103.

The ultrasonic driving circuit 103 generates a driving signal (modulation signal) for modulating ultrasonic from the M sequence data supplied from the NI sequence generation circuit 102 (Step 305).

The reception trigger driving circuit 105 generates a reception trigger driving signal in response to the trigger pulse generation instruction from the control circuit 101 (Step 306).

When both the driving signals are generated at Steps 303 and 304, the reception trigger transmitter 106 and the ultrasonic transmitter 104 are simultaneously driven by the outputs of the reception trigger driving circuit 105 and the ultrasonic driving circuit 103, respectively, to send the trigger signal and the ultrasonic signal modulated by the M sequence into space through the electronic pen 10 (Step 307).

When Step 307 is executed, the control circuit 101 determines whether all the M sequence initial conditions are checked at a determination Step 308. Unless transmission of all the M sequences is completed, the control circuit 101 returns to Step 301 to set an initial condition of a subsequent M sequence.

Accordingly, until transmission of all the M sequences is completed, Steps 301 through 307 are sequentially executed to sequentially send a plurality of ultrasonic signals modulated by different M sequences.

Then, at the same time as the transmission of each ultrasonic signal, initial condition data obtained by coding the initial conditions of these M sequences and a plurality of trigger signals modulated by a trigger pulse will be sequentially sent out. In a case of the ultrasonic signal whose phase is modulated by the 15-bit M sequence shown in FIG. 2, the processing from Steps 301 to 307 will be repeated 15 times to check 15 kinds of M sequence data.

When the transmission of all the M sequences is completed (Step 308), select an M sequence to be used among all the M sequences (Step 309).

Next, description will be made of a case of the ultrasonic propagation time measurement mode. In FIG. 5, first, when the electronic pen 10 starts operation, (Step 301), out of initial conditions of M sequences corresponding to an M sequence selected in the M sequence selection mode, the control circuit 101 sequentially determines one in each transmission cycle (Step 312) and supplies the determined initial condition to the M sequence generation circuit 102 (Step 313).

In addition, when determining the M sequence initial condition, the control circuit 101 supplies the reception trigger driving circuit with the trigger pulse and the M sequence initial condition data to instruct the circuit to generate a trigger signal (Step 314).

The M sequence generation circuit 102 generates M sequence data based on the supplied initial condition (Step 315) and supplies the same to the ultrasonic driving circuit 103.

The ultrasonic driving circuit 103 generates a driving signal (modulation signal) for modulating ultrasonic from the M sequence data supplied from the M sequence generation circuit 102 (Step 316).

In addition, the reception trigger driving circuit 105 generates a reception trigger driving signal (Step 317).

When both the driving signals are generated at Steps 316 and 317, the reception trigger transmitter 106 and the ultrasonic transmitter 104 are simultaneously driven by the outputs of the reception trigger driving circuit 105 and the ultrasonic driving circuit 103, respectively, to send out the trigger signal and the ultrasonic signal modulated by the M sequence into space through the electronic pen 10 (Step 318).

When Step 318 is executed, the control circuit 101 drives a timer for determining a transmission cycle (Step 319). Upon detecting a subsequent transmission time point (Step 320), the control circuit 101 determines whether the operation of the electronic pen 10 ends or not (Step 321) and when it is in operation, the control circuit 101 returns to Step 312 to again determine an initial condition of an M sequence at a time point when a subsequent transmission cycle starts and repeat the above-described operation.

When the operation of the electronic pen 10 ends, the control circuit 101 returns to Step 311 from Step 321.

Figure 6:
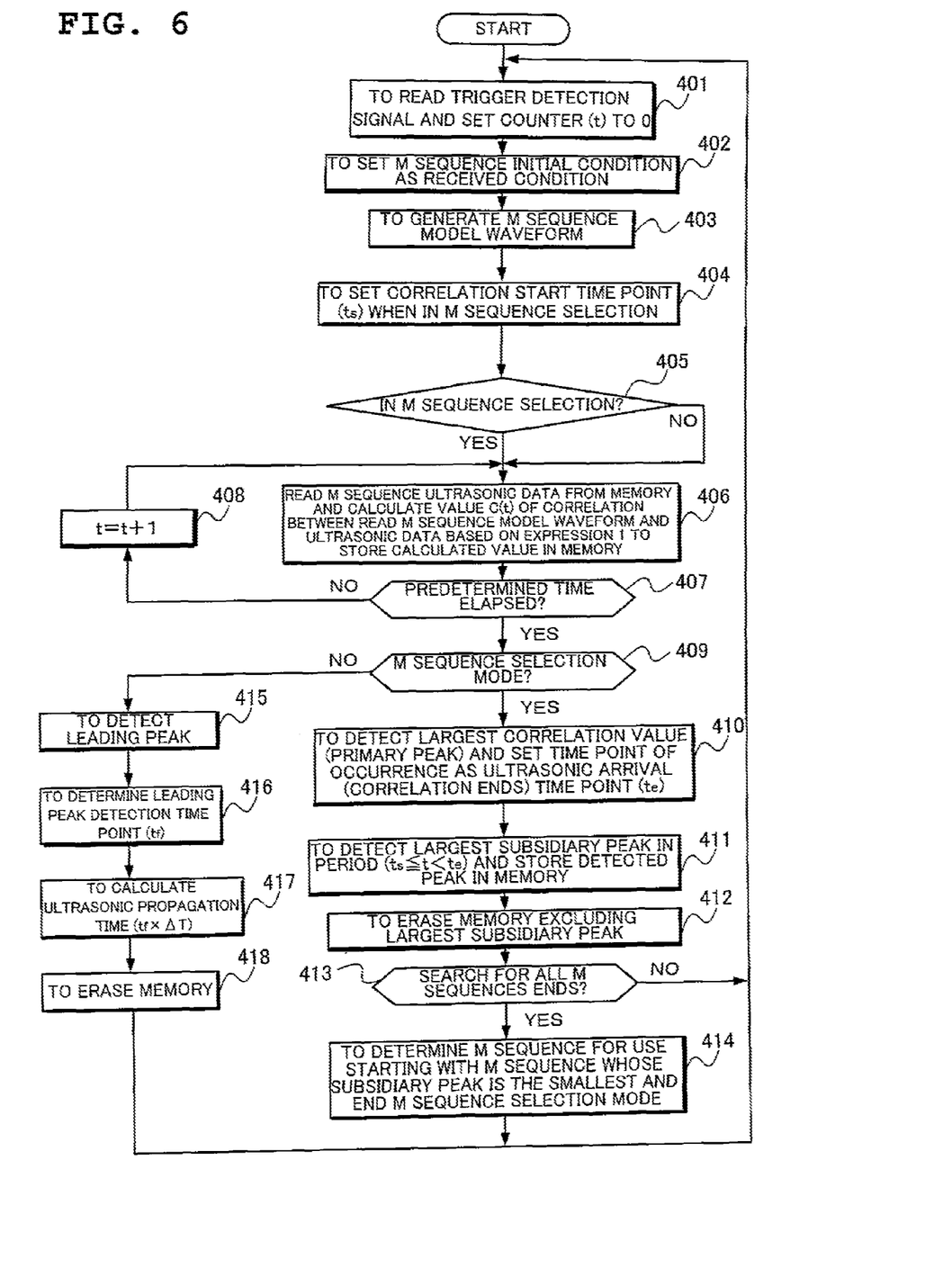
FIG. 6 is a flow chart showing operation of the reception unit in the position detection system according to the first exemplary embodiment of the present invention.

In the reception unit 200, before the data processing circuit 206 executes the processing according to the flow chart of FIG. 6, the sampling circuit 202 samples the ultrasonic signal received by the ultrasonic receiver 201 at fixed sampling intervals and stores the sampled ultrasonic waveform data in the memory 205. On the other hand, the detection circuit 204 detects the trigger detection signal and the M sequence initial condition data from the trigger signal received by the reception trigger receiver 203 and stores the same in the memory 205.

When reading the trigger detection signal from the memory 205, the data processing circuit 206 sets the value "t" (sampling time) of the sampling counter to be "0" (Step 401).

Set the M sequence initial condition to be the initial condition stored in the memory (Step 402) and based on the initial condition, generate such an M sequence model waveform obtained by phase modulation as shown in FIG. 2 (Step 403). The data processing circuit 206 sets a correlation start time point ($t_s$) (step 405) when in M sequence selection (Step 404) and proceeds to a correlation value calculation Step 406.

At Step 406, first read a number N of ultrasonic waveform data from the memory 205 and execute calculation of correlation with the model waveform generated at Step 403 to calculate a correlation value C(t) based on the following Expression (1) and store the same in the memory.

$$C(t) = \frac{1}{N}\sum_{i=0}^{N-1} r(i)f(i+t) \quad \text{(NUMERICAL EXPRESSION 1)}$$

In Expression (1), "i" is an integral value which is a variable representing a sampling time, "N" represents the number of samplings of a model waveform, "r(i)" represents a value of a model waveform at a sampling time i and "f(i+t)" represents a value of a waveform at a sampling time (i+t).

Determine whether a predetermined time has elapsed from the correlation processing start (Step 407) and when it has yet to be elapsed, increment the sampling time t by a unit time of "1" at Step 408 to return to Step 406. The correlation calculation is executed until the predetermined time has elapsed and a plurality of correlation values are stored in the memory 205.

When the predetermined time has elapsed since the correlation starts, determine whether it is in M sequence selection or not (Step 409) and when in M sequence selection, detect a largest correlation value (primary peak) from the correlation values stored in the memory 205 and set a time of the occurrence as an ultrasonic arrival time ($t_e$) (Step 410).

At Step 411, the data processing circuit 206 detects the largest correlation value in a period from the correlation start time point until immediately before the ultrasonic arrival time point, that is, in a period of $t_s \leq t < t_e$, based on the following Expression (2).

$$P(n) = \max\{C(t)\}, (t_s \leq t < t_e)$$

Here, P(n) represents the largest value of a correlation value C(t) in a period ($t_s \leq t < t_e$) prior to an ultrasonic arrival time point under an initial condition n of a certain M sequence. The period is, for example, a period in which a form of arriving ultrasonic partially coincides with a model waveform, and a correlation value appearing as a result will be referred to as a subsidiary peak. $t_s$ and $t_e$ are not limited and can be arbitrarily determined. The largest subsidiary peak detected is stored in the memory 205.

Next, the ultrasonic data and all the correlation values stored in the memory 205 are erased at Step 412 to prepare for storage of ultrasonic data, a trigger detection signal and M sequence initial condition data to come next.

The data processing circuit 206 determines whether selection of all the M sequences is completed or not (step 413) and when it is yet to be completed, returns to Step 401 to monitor the memory 205 for detecting arrival of subsequent trigger signal and ultrasonic signal and read a trigger detection signal.

When the selection of all the M sequences is completed, the data processing circuit 206 proceeds to Step 414 to sequentially select, starting with the smallest subsidiary peak from among all the subsidiary peaks stored in the memory 205, its corresponding M sequence as an M sequence to be used and ends the M sequence selection mode to return to Step 401.

While as other exemplary embodiment of the present invention, when the control circuit 101 on the transmission side determines an M sequence initial condition, an M sequence bit string is automatically determined by a characteristic polynomial set in advance, a bit arrangement with one bit shifted is also possible without changing a bit arrangement of an M sequence.

Figure 7:
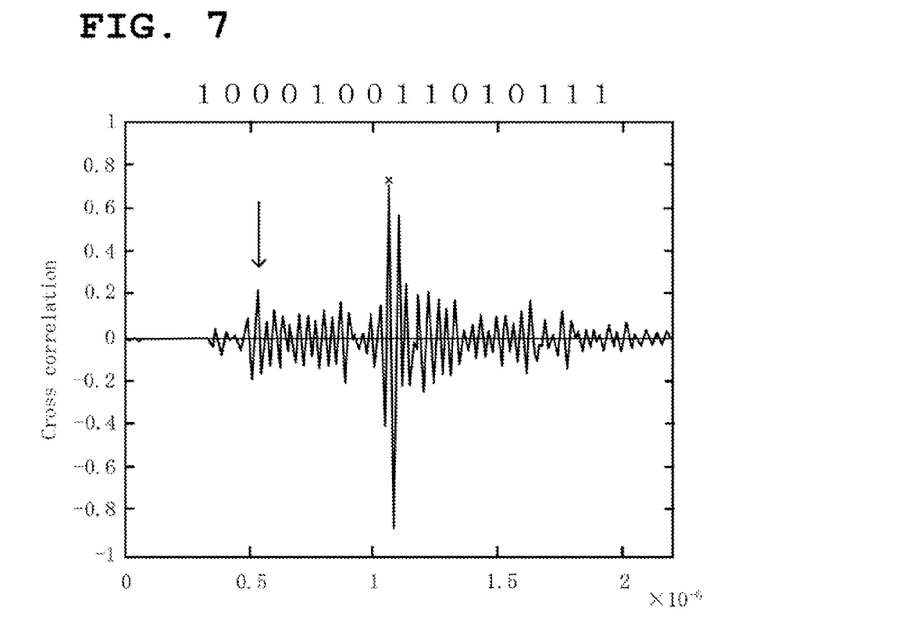
FIG. 7 is a diagram showing a waveform of a correlation value in a case where an M sequence in the M sequence selection mode is "100010011010111"

FIG. 7 shows a value of correlation between the above-described ultrasonic waveform and the 15-bit M sequence model waveform shown in FIG. 2, which represents that at a point indicated by the arrow, the largest subsidiary peak is detected at Step 410.

Figure 8:
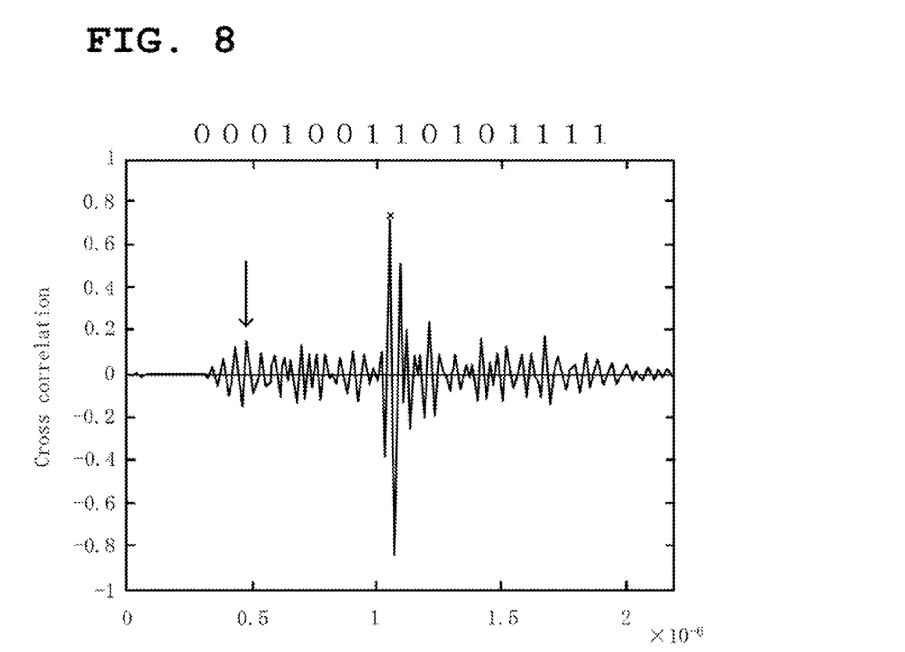
FIG. 8 is a diagram showing a waveform of a correlation value in a case where an M sequence in the M sequence selection mode is "000100110101111"

FIG. 8 shows a correlation value in a case where ultrasonic is used whose phase is modulated by a data string of the 15-bit M sequence in FIG. 2 with one bit shifted, that is, "000100110101111", and represents that the largest subsidiary peak is detected at the point indicated by the arrow.

Figure 9:
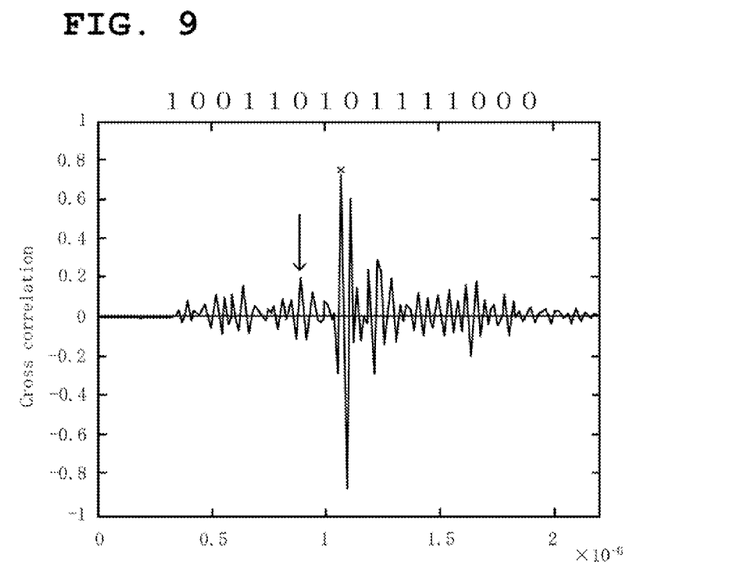
FIG. 9 is a diagram showing a waveform of a correlation value in a case where an M sequence in the M sequence selection mode is "100110101111000"

FIG. 9 shows a correlation value in a case where ultrasonic is used whose phase is modulated by a data string of a 15-bit M sequence "100110101111000" and represents that the largest subsidiary peak is detected at the point indicated by the arrow.

In FIG. 7 through FIG. 9, with a time point of reception of a trigger pulse as "0", the sampling interval is 3.125 μsec. As long as the transmission unit 100 and the reception unit 200 are maintained at a fixed distance from each other, a correlation value peak (main peak) at the ultrasonic arrival time point appears at the same time.

Because an ultrasonic signal attenuates by a propagation distance, a necessary number of M sequences should be set taking into consideration how many preceding cycle ultrasonic signals might be received by the reception unit 200.

In a case, for example, where down to three preceding cycle ultrasonic signals might be received, it is necessary to obtain at least four different M sequences and in a case where down to one preceding cycle ultrasonic signals might be received, it is necessary to obtain at least two different M sequences. In a case of selecting two different M sequences, M sequences "000100110101111" and "100110101111000" whose largest subsidiary peak is Small in FIG. 7 through FIG. 9 are selected as an M sequence to be used.

Moreover, as a further exemplary embodiment of the present invention, the reception unit 200 can be provided with a mapping table in which with a plurality of different codes (or indexes) assigned corresponding to a plurality of different M sequences, each of these codes and an initial condition of its corresponding M sequence and a characteristic polynomial are correlated.

In the M sequence selection mode, when transmitting one M sequence, the transmission unit 100 transmits a code (index) assigned to the M sequence by a trigger signal and the reception unit 200 refers to the mapping table to read an M sequence initial condition and a characteristic polynomial correlated with the received code.

This method enables the M sequence initial condition and the characteristic polynomial to be transmitted to the reception side by a small amount of information. A bit string of different M sequences may be assigned to the mapping table.

Thus determined M sequence initial condition is set at the control circuit 101 of the transmission unit 100 and used in the ultrasonic propagation time measurement mode. Accordingly, the transmission unit 100 circularly changes the set plurality of M sequences in each transmission cycle and based on the M sequence, generates a trigger signal and an ultrasonic signal and sends the same to the reception unit 200.

When in the ultrasonic propagation time measurement mode, the trigger signal and the ultrasonic signal generated based on the selected M sequence are sent out from the transmission unit 100, the data processing circuit 206 reads a trigger detection signal from the memory 205 at Step 401 and sets the M sequence initial condition as an initial condition stored in the memory at Step 402 to generate an M sequence model waveform (Step 403).

Since it is not the M sequence selection mode, the data processing circuit 206 jumps over Step 405 to proceed to Step 406, reads one sample of M sequence ultrasonic data from the memory 205 as described above, executes calculation of correlation with the M sequence model waveform generated at Step 403, calculates the correlation value C(t) based on Expression (1) and stores the same in the memory 205.

The data processing circuit 206 executes Step 406 until a predetermined time elapses and proceeds from Step 407 to Step 409. At Step 409, since the M sequence selection mode is already finished, processing starting with Step 415 is executed.

At Step 415, the data processing circuit 206 selects a correlation value larger than a predetermined value which is larger than a value of a subsidiary peak from among all the correlation values calculated within the predetermined time and detects a leading peak from among them.

Set a sampling time ($t_r$) at the time point where the leading peak is detected as a leading peak detection time point (Step 416) to calculate an ultrasonic propagation time ($t_r*\Delta T$) (Step 417). Next, at Step 418, erase all the data from the memory 205.

In the following, description will be made of an example of processing by the data processing circuit 206 to detect a position of the electronic pen 10 as a moving body from the ultrasonic propagation time measured in the manner as described above.

Figure 10:
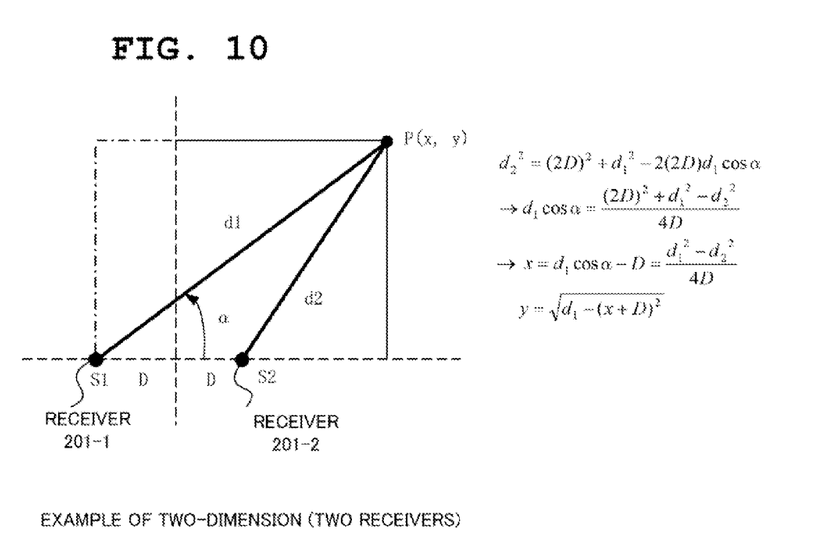
FIG. 10 is a diagram for use in two-dimensionally explaining an electronic pen position calculation method in the position detection system according to the first exemplary embodiment of the present invention.

FIG. 10 is a diagram two-dimensionally showing a method of calculating a position of the electronic pen 10 and the ultrasonic receivers 201-1 and 201-2. In FIG. 10, P represents a position coordinate value (x, y) on the x-y coordinates within a drawing range of the electronic pen 10, and S1 and S2 represent positions of the ultrasonic reception units 201-1 and 201-2, respectively.

d1 represents a distance from the electronic pen 10 to the ultrasonic receiver 201-1 and d2 represents a distance from the electronic pen 10 to the ultrasonic receiver 201-2. D represents a distance from an origin, with the center of the ultrasonic receivers 201-1 and 201-2 as the origin of the x-y coordinates. α shows an angle formed by a straight line linking the electronic pen 10 and the ultrasonic receiver 201-1 with the x axis.

Here, set the ultrasonic propagation times calculated based on the ultrasonic signals received by the ultrasonic receivers 201-1 and 201-2 to be t1 and t2, respectively, and set a sound velocity to be A.

The distances d1 and d2 can be calculated as d1=A*t1 and d2=A*t2. Since the relationship shown in FIG. 10 is established between the interval length (2D) between the ultrasonic receivers 201-1 and 201-2 and the distances d1 and d2, the position (x, y) of the electronic pen 10 can be obtained by calculation.

Also by setting the number of ultrasonic receivers to be three or more, it is possible to specify a three-dimensional position.

Figure 11:
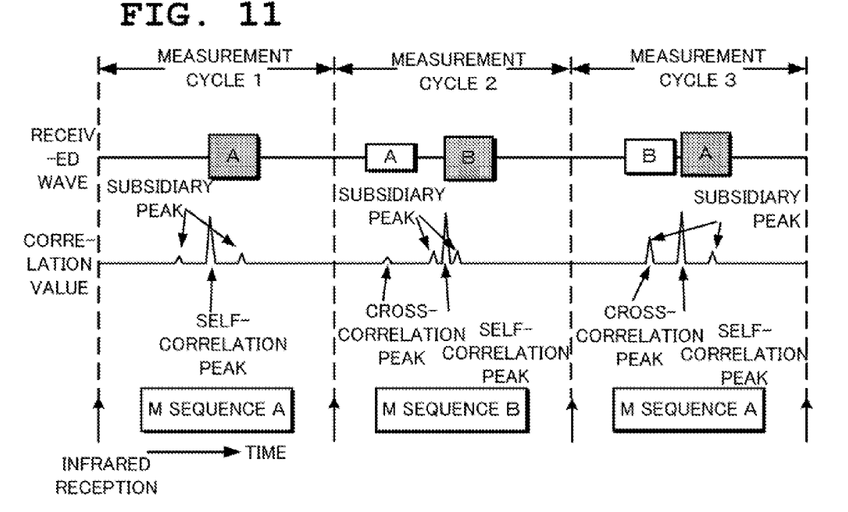
FIG. 11 is a diagram showing operation of a reception unit 200 in the ultrasonic propagation time measurement mode in the position detection system according to the first exemplary embodiment of the present invention.

FIG. 11 is a diagram for use in explaining operation of the reception unit 200 in the ultrasonic propagation time measurement mode. Although in each measurement cycle, a reflected wave in other preceding cycle is received than a direct wave, use of M sequence ultrasonic whose subsidiary peak is small enables detection of a peak of a direct wave even when a peak of a value of cross-correlation between a reflected wave in a preceding cycle and an M sequence model waveform in the present cycle and a subsidiary peak overlap with each other.

On the other hand, in the M sequence selection mode, every time the reception device 20 receives a trigger signal and an ultrasonic signal, obtain a value of correlation with each of all the M sequence model waveforms for use for an ultrasonic signal to check a value of cross-correlation between different M sequences. At this time, it is possible to give higher evaluation to M sequence data whose peak of a cross-correlation value is smaller and starting with an M sequence whose cross-correlation value peak is the smallest among all the M sequences, assign an M sequence (initial condition) forming a combination of M sequences corresponding to the cross-correlation value as an M sequence to be used.

It is further possible to select, among M sequences whose subsidiary peak is small, a combination of M sequences whose cross-correlation value is small and assign the same as an M sequence to be used.

(Effects Of The First Exemplary Embodiment)

According to the above-described first exemplary embodiment, since use of M sequence ultrasonic whose subsidiary peak is small enables detection of a peak of a direct wave even when a peak of a value of cross-correlation between a reflected wave in a preceding cycle and an M sequence model waveform in the present cycle and a subsidiary peak overlap with each other, it is possible to precisely calculate a propagation time of a direct wave arriving the first from an ultrasonic emission source without being affected by a reflected wave of an ultrasonic signal.

Figure 12:
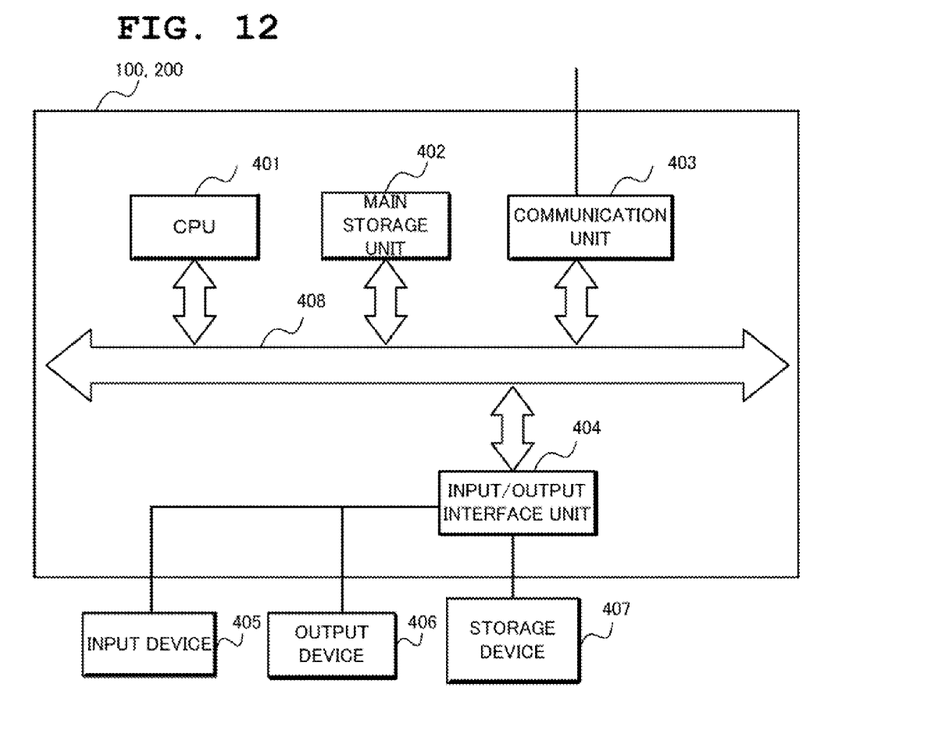
FIG. 12 is a diagram showing an example of a hardware structure of the transmission unit and the reception unit in the position detection system according to the first exemplary embodiment of the present invention.

Description will be here made of an example of a hardware structure of the transmission unit 100 of the electronic pen 10 and the reception unit 200 of the reception device 20 with reference to FIG. 12.

With reference to FIG. 12, the transmission unit 100 and the reception unit 200, which can be realized by the same hardware structure as that of a common computer device, comprises a CPU (Central Processing Unit) 401, a main storage unit 402 as a main memory such as an RAM (Random Access Memory) for use as a data working region or a data temporary saving region, a communication unit 403 functioning as a transmitter and a receiver of an electromagnetic wave signal and an ultrasonic signal, an input/output interface unit 404 connected to an input device 405, an output device 406 and a storage device 407 for transmitting and receiving data, and a system bus 408 which connects each of the above-described components with each other. The storage device 407 is realized by a hard disk device or the like formed of a non-volatile memory such as a ROM (Read Only Memory), a magnetic disk and a semiconductor memory.

The position detection system according to the present exemplary embodiment has its operation realized not only in hardware by mounting a circuit part which is a hardware part such as an LSI (Large Scale Integration) with a position detection program realizing the respective functions shown in FIG. 1 incorporated into a computer but also in software by storing the position detection program in the storage device 407, loading the program into the main storage unit 402 and executing the same by the CPU 401.

Although the present invention has been described with respect to the preferred exemplary embodiment and modes of implementation in the foregoing, the present invention is not necessarily limited to the above-described exemplary embodiment and modes of implementation and can be implemented in various modifications without departing from the scope of its technical ideas.

While the above-described exemplary embodiment has been described with respect to a case where the present invention is applied to an electronic pen system, it can be also applied to a robot system. Disposing the transmission device in a robot and disposing the reception device on a ceiling or a wall in certain space enables detection of a position of the robot in the space. Grasping the position of the robot in the space allows such use as controlling the robot to prevent collision.

On the other hand, attaching the transmission device to a human body or the like and disposing the reception device on a ceiling or a wall in certain space allows application to such use as traffic line detection or position tracing in space.

Although the description has been made of modulation by an M sequence, it is not necessarily limited to an M sequence but is applicable to a pseudo random signal whose self-correlativity is high and whose cross-correlation with other sequence is weak such as a Gold sequence.

What is claimed is:

1. A position detection system, comprising:
a moving body including a transmission unit which sends an ultrasonic signal modulated based on a pseudo random signal whose self-correlativity is high; and
a reception unit which receives said ultrasonic signal, generates a model waveform of ultrasonic modulated by the same pseudo random signal as said pseudo random signal, obtains a value of correlation with the received ultrasonic signal, and starting with the smallest one of subsidiary peaks of a correlation value appearing when the ultrasonic signal coincides in part with the model waveform, selects a plurality of pseudo random signals corresponding to said subsidiary peaks, wherein
said transmission unit comprises
a unit which simultaneously sends an electromagnetic wave signal and an ultrasonic signal modulated based on one of said pseudo random signals selected, and
said reception unit comprises
a unit which executes processing of correlation between the ultrasonic signal and a model waveform modulated by said pseudo random signal to specify an arrival time of said ultrasonic signal and calculates a propagation time of ultrasonic signal from an arrival time point of said electromagnetic wave signal and the specified arrival time, and
a unit which calculates a position of said moving body based on said ultrasonic propagation time calculated and a length of interval between the ultrasonic reception units, and wherein
said transmission unit uses a pseudo random signal differing in each transmission cycle,
wherein said pseudo random signal is an M sequence,
wherein said transmission unit sends out an ultrasonic signal modulated by M sequence data generated based on data defining an arbitrary M sequence selected from among a plurality of M sequences different from each other and an electromagnetic wave signal including data defining said M sequence.

2. The position detection system according to claim 1, wherein
said transmission device comprises
an electromagnetic wave transmission unit which determines a transmission timing and data defining an M sequence in each transmission cycle and sends an electromagnetic wave signal including a trigger signal indicative of the transmission timing and the data defining the M sequence into space, and
an ultrasonic transmission unit which generates an M sequence waveform based on data defining an M sequence determined in each said transmission cycle and sends an ultrasonic signal of the M sequence waveform simultaneously with said electromagnetic wave signal into space,
said reception unit comprises
an ultrasonic reception unit which receives said ultrasonic signal sent to output an M sequence waveform,
a detection unit which detects, from said electromagnetic wave signal received, said trigger signal and data defining said M sequence,
a storage circuit which stores data defining said M sequence which is detected by said detection unit and an M sequence waveform output by said ultrasonic reception unit, and
a data processing circuit which reads data defining an M sequence from said storage circuit, generates an M sequence model waveform, sequentially reads stored M sequence data to calculate a value of correlation with the M sequence model waveform, detects a first correlation peak of the calculated correlation value and determines an ultrasonic propagation time from a time point of reception of said trigger signal and a time point of detection of the correlation peak, as well as calculating a position of said moving body based on said ultrasonic propagation time and a length of an interval between the ultrasonic reception units.

3. The position detection system according to claim 1, wherein data defining an M sequence which said electromagnetic wave signal includes is M sequence initial condition data.

4. The position detection system according to claim 1, wherein data defining an M sequence which said electromagnetic wave signal includes is a characteristic polynomial and initial condition data of an M sequence.

5. The position detection system according to claim 1, wherein said ultrasonic signal is phase-modulated by M sequence data.

6. The position detection system according to claim 1, wherein as said electromagnetic wave signal, infrared is transmitted.

7. The position detection system according to claim 1, wherein said moving body is an electronic pen.

8. The position detection system according to claim 1, wherein said moving body is a robot.

9. A transmission device of a position detection system in which an ultrasonic signal transmitted from the transmission device is received by a reception device to detect a position of said transmission device, comprising:
- a unit which sends a first ultrasonic signal modulated based on a pseudo random signal whose self-correlativity is high; and
- a unit which simultaneously sends an electromagnetic wave signal indicative of transmission timing and a second ultrasonic signal modulated based on a pseudo random signal selected by said reception device, wherein
- a pseudo random signal differing in each transmission cycle is used,
- wherein said pseudo random signal is of an M sequence,
- and the transmission device sends out an ultrasonic signal modulated by M sequence data generated based on data defining an arbitrary M sequence selected from among a plurality of M sequences different from each other and an electromagnetic wave signal including data defining said M sequence.

10. The transmission device according to claim 9, wherein data defining an M sequence which said electromagnetic wave signal includes is M sequence initial condition data.

11. The transmission device according to claim 9, wherein data defining an M sequence which said electromagnetic wave signal includes is a characteristic polynomial and initial condition data of an M sequence.

12. The transmission device according to claim 9, wherein said ultrasonic signal is phase-modulated by M sequence data.

13. The transmission device according to claim 9, wherein as said electromagnetic wave signal, infrared is transmitted.

14. A reception device of a position detection system in which an ultrasonic signal transmitted from a transmission device is received by the reception device to detect a position of said transmission device, comprising:
- a unit which receives a first ultrasonic signal modulated by data of a pseudo random sequence with high self-correlativity which is transmitted from said transmission device, generates a model waveform modulated by the same pseudo random signal as said pseudo random signal, obtains a value of correlation with the received ultrasonic signal, and starting with the smallest one of subsidiary peaks of a correlation value appearing when the ultrasonic signal coincides in part with the model waveform, selects a plurality of pseudo random signals corresponding to said subsidiary peaks;
- a unit which receives an electromagnetic wave signal and a second ultrasonic signal modulated based on one of said pseudo random signals selected by said reception device which are simultaneously sent from said transmission device, executes processing of correlation between the second ultrasonic signal and an ultrasonic model waveform modulated by said pseudo random signal to specify an arrival time of said ultrasonic signal, and calculates a propagation time of ultrasonic signal from an arrival time point of said electromagnetic wave signal and the specified arrival time; and
- a unit which calculates a position of said moving body based on said ultrasonic propagation time calculated and a length of interval between the ultrasonic reception units,
- wherein said pseudo random signal is an M sequence,
- and the reception device receives, from said transmission device, an ultrasonic signal modulated by M sequence data generated based on data defining an arbitrary M sequence selected from among a plurality of M sequences different from each other and an electromagnetic wave signal including data defining said M sequence.

15. The reception device according to claim 14, wherein data defining an M sequence which said electromagnetic wave signal includes is M sequence initial condition data.

16. The reception device according to claim 14, wherein data defining an M sequence which said electromagnetic wave signal includes is a characteristic polynomial and initial condition data of an M sequence.

17. The reception device according to claim 14, wherein said ultrasonic signal is phase-modulated by M sequence data.

18. The reception device according to claim 14, wherein as said electromagnetic wave signal, infrared is transmitted.

19. A position detection method, comprising the steps of:
- a) sending out an ultrasonic signal modulated based on a pseudo random signal whose self-correlativity is high from a transmission unit of a moving body;
- b) receiving said ultrasonic signal at a reception unit, generating a model waveform of modulated by said pseudo random signal and executing correlation between the model waveform and the received ultrasonic signal to detect a correlation waveform;
- c) with respect to different pseudo random signals, detecting said correlation waveform in plural, and starting with the smallest one of subsidiary peaks appearing in each correlation waveform when said model waveform and the received ultrasonic signal coincide in part, selecting a plurality of pseudo random signals corresponding to said subsidiary peaks;
- d) sending an ultrasonic signal modulated based on one of said pseudo random signals selected at said Step (c) and an electromagnetic wave signal including a trigger signal indicative of transmission timing and data which defines the pseudo random signal simultaneously from said moving body in each fixed transmission cycle;
- e) receiving the electromagnetic wave signal to generate a model waveform modulated by said pseudo random signal from data which defines a pseudo random signal that the electromagnetic wave signal includes;
- f) receiving said ultrasonic signal to calculate a value of correlation between the received ultrasonic signal and said model waveform generated at Step (e); and
- g) calculating a position of said moving body based on said ultrasonic propagation time calculated and a length of interval between said ultrasonic reception units, wherein
- said step (d) uses a pseudo random signal differing in each transmission cycle,
- wherein said pseudo random signal is an M sequence,
- wherein said transmission device sends out an ultrasonic signal modulated by M sequence data generated based on data defining an arbitrary M sequence selected from among a plurality of M sequences different from each other and an electromagnetic wave signal including data defining said M sequence.

20. The position detection method according to claim 19, wherein data defining an M sequence which said electromagnetic wave signal includes is M sequence initial condition data.

21. The position detection method according to claim 19, wherein data which defines an M sequence that said electromagnetic wave signal includes is a characteristic polynomial and initial condition data of an M sequence.

22. The position detection method according to claim 19, wherein said ultrasonic signal is phase-modulated by M sequence data.

23. The position detection method according to claim 19, wherein as said electromagnetic wave signal, infrared is transmitted.

24. The position detection method according to claim 19, wherein said moving body is an electronic pen.

25. The position detection method according to claim 19, wherein said moving body is a robot.

26. A non-transitory computer readable storage medium storing a position detection program, wherein
said position detection program causes a transmission device formed by a computer provided in a moving body to execute
sending out an ultrasonic signal modulated based on a pseudo random signal whose self-correlativity is high from a transmission unit of the moving body,
causes a reception device formed by a computer to execute
receiving said ultrasonic signal, generating a model waveform modulated by said pseudo random signal and executing processing of correlation between the model waveform and the received ultrasonic signal to detect a correlation waveform, and
with respect to different pseudo random signals, a processing of detecting said correlation waveform in plural, and starting with the smallest one of subsidiary peaks appearing in each correlation waveform when said model waveform and the received ultrasonic signal coincide in part, selecting a plurality of pseudo random signals corresponding to said subsidiary peaks,
causes said transmission device to execute
sending an ultrasonic signal modulated based on one of said pseudo random signals selected and an electromagnetic wave signal including a trigger signal indicative of transmission timing and data which defines the pseudo random signal simultaneously from said moving body in each fixed transmission cycle, and
causes said reception device to execute
receiving the electromagnetic wave signal to generate a model waveform modulated by said pseudo random signal from data which defines a pseudo random signal that the electromagnetic wave signal includes,
receiving said ultrasonic signal to calculate a value of correlation between the received ultrasonic signal and said model waveform generated, and
calculating a position of said moving body based on said ultrasonic propagation time calculated and a length of interval between said ultrasonic reception units, wherein
in the sending-out of said ultrasonic signal from said transmission device, a pseudo random signal differing in each transmission cycle is used,
wherein said pseudo random signal is an M sequence,
wherein the computer forming said transmission device sends out an ultrasonic signal modulated by M sequence data generated based on data which defines an arbitrary M sequence selected from among a plurality of M sequences different from each other and an electromagnetic wave signal including data which defines said M sequence.

27. The non-transitory computer readable storage medium according to claim 26, wherein data defining an M sequence which said electromagnetic wave signal includes is M sequence initial condition data.

28. The non-transitory computer readable storage medium according to claim 26, wherein data which defines an M sequence that said electromagnetic wave signal includes is a characteristic polynomial and initial condition data of an M sequence.

29. The non-transitory computer readable storage medium according to claim 26, wherein said ultrasonic signal is phase-modulated by M sequence data.

30. The non-transitory computer readable storage medium according to claim 26, wherein as said electromagnetic wave signal, infrared is transmitted.

31. The non-transitory computer readable storage medium according to claim 26, wherein said moving body is an electronic pen.

32. The non-transitory computer readable storage medium according to claim 26, wherein said moving body is a robot.

* * * * *